(12) United States Patent
Huang et al.

(10) Patent No.: US 8,981,752 B2
(45) Date of Patent: Mar. 17, 2015

(54) ENERGY-BASED ORIENTED SWITCHING MODE POWER SUPPLY

(75) Inventors: Chung-Hsun Huang, Tainan (TW); Chao-Chun Chen, Kaohsiung (TW)

(73) Assignee: National Chung Cheng University, Chia-Yi (TW)

( * ) Notice: Subject to any disclaimer, the term of this patent is extended or adjusted under 35 U.S.C. 154(b) by 476 days.

(21) Appl. No.: 13/429,078

(22) Filed: Mar. 23, 2012

(65) Prior Publication Data
US 2013/0162237 A1 Jun. 27, 2013

(30) Foreign Application Priority Data
Dec. 23, 2011 (TW) .............................. 100148278 A

(51) Int. Cl.
*H02M 3/158* (2006.01)
(52) U.S. Cl.
USPC .......................................... 323/283; 323/271
(58) Field of Classification Search
CPC ..................... H02M 3/158; H02M 2001/0003; H02M 2001/0032; H02M 2001/0035
USPC ......... 323/222–225, 271–275, 282–285, 351; 327/172–177; 375/237–239
See application file for complete search history.

(56) References Cited

U.S. PATENT DOCUMENTS

| | | | |
|---|---|---|---|
| 6,366,070 B1 * | 4/2002 | Cooke et al. .................. | 323/284 |
| 7,245,113 B2 * | 7/2007 | Chen et al. .................... | 323/271 |
| 2006/0043951 A1 * | 3/2006 | Oswald et al. ................ | 323/282 |
| 2007/0257647 A1 * | 11/2007 | Chen et al. .................... | 323/282 |
| 2010/0315054 A1 * | 12/2010 | Gan .............................. | 323/283 |
| 2011/0012658 A1 * | 1/2011 | Hsieh et al. ................... | 327/172 |
| 2011/0241641 A1 * | 10/2011 | Chen et al. .................... | 323/284 |

OTHER PUBLICATIONS

Chi-Lin Chen et al., A New PWM/PFM Control Technique for Improving Efficiency Over Wide Load Range, Aug. 31, 2008-Sep. 3, 2008, pp. 962-965, 15th IEEE International Conference on Electronics, Circuits and Systems.
Jing Wang et al., Design and Implementation of High-Efficiency and Low-Power DC-DC Converter with PWM/PFM Modes, Oct. 22-25, 2007, pp. 596-599, 7th International Conference on ASIC.

(Continued)

*Primary Examiner* — Timothy J Dole
*Assistant Examiner* — Ivan Laboy Andino
(74) *Attorney, Agent, or Firm* — Muncy, Geissler, Olds & Lowe, P.C.

(57) ABSTRACT

An energy-based oriented switching mode power supply includes a bi-directional converter having an energy input and a load output, and an energy based pulsed generator connected between the energy input and the load output for outputting a gate voltage signal controlling how much energy is supplied from the energy input. The energy based pulsed generator receives a clock signal and outputs the gate voltage signal according to the load output of the bi-directional converter when the clock signal is at a high level. Accordingly, the switching mode power supply achieves a hybrid of PWM and PFM, depending on the energy demand of the load output, for a fast transient response and a small voltage ripple whilst improving power efficiency over a wide load range.

12 Claims, 5 Drawing Sheets

(56) References Cited

OTHER PUBLICATIONS

J. Hannon et al., Digital PWM with variable frequence for monolithic buck converter, Nov. 5, 2009, two pages, vol. 45, No. 23, Electronics Letters.

Chung-Hsun Huang et al., A fast and high efficiency buck converter with Switch-On-Demand Modulator for wide load range applications, Jun. 25, 2011, pp. 963-968, vol. 8, No. 12, IEICE Electronics Express.

* cited by examiner

ENERGY-BASED ORIENTED SWITCHING MODE POWER SUPPLY

BACKGROUND OF THE INVENTION

1. Field of the Invention

The present invention relates to a switching mode power supply, and in particular to a switching mode power supply having an Energy Based Pulsed Generator.

2. The Prior Arts

In recent technology development, DC to DC converters have become one of the widely used power supplies, and can be divided into three types of Buck converters, Boost converters, and Buck-Boost converters due to their different voltage-modulating characteristics. Therefore, three different circuit implementations, including Low-Dropout Linear Regulator, Switching Mode Power Supply, and Switching Capacitor Power Supply, which is respectively carried out by the buck converter, boost converter, and buck-Boost converter, are commonly required in many types of portable devices for extending the battery life.

To be more specific, the Low-Dropout Linear Regulator has lower power transfer efficiency and can only be applied to buck converters, thereby limiting its application range. On the other hand, the Switching Mode Power Supply and the Switching Capacitor Power Supply can be both applied to buck and boost converters, or to output opposite voltage according to different topology. Therefore, compared to the Low-Dropout Linear Regulator, the Switching Mode Power Supply is considered to be having higher power transfer efficiency, wider load range, capable of effectively modulating output voltages, and thus being widely used in many types of electronics products.

In general, there are many different operating modes for users to switch the converter due to different applications. For example, these modes may include normal mode, efficient mode, sleep mode, and etc. A switch between these different modes usually induces the loading current of the DC to DC converter to be changed. As mentioned before, the above mentioned converters are set to provide different loading current according to different operating modes, or how heavy or light the load condition is. Also, the converters have to keep high power transfer efficiency even under an extremely wide load range, and to respond to how the load condition or input energy changes in a short time, to aim for a proper output voltage range.

However, the power transfer efficiency of converters is usually related to its load condition. For example, in bulk converter designs, power losses come mainly from conduction losses with a heavy load while switching losses dominate with a light load. As a result, to improve power transfer efficiency over a wide load range, converters in the conventional way usually hop alternatively between PWM (Pulse-Width Modulation) mode and PFM (Pulse Frequency Modulation) mode for heavy and light load conditions, respectively.

FIG. 1 illustrates a conventional circuit diagram of control mode hopping technology, which uses a control mode detection unit 2 and a control mode selecting unit 3 for detecting the load condition of a power stage 4, feeding the result back to a multi-mode controller 1 for switching to a proper control mode, and eventually driving the power stage 4 through a power transistor buffer 5. However, it should be noted that, not only does the converter require different control blocks (including the Pulse width modulation, PWM 11 and the Pulse frequency modulation, PFM 12), the mode decision circuits should also be developed to precisely change the operation mode. As a result, the converter is complicated and incurs significant voltage variation during changes in the operation mode. Furthermore, a larger voltage ripple is induced in PFM mode because a large enough peak inductor current is set to improve the power transfer efficiency.

Therefore, the persons skilled in the art are eager to develop a novel switching mode power supply with a more simple control circuit that effectively adjust and switch the converter so as to overcome the above-mentioned problems.

SUMMARY OF THE INVENTION

In view of the problems and shortcomings, the present invention provides an energy-based oriented switching mode power supply, to solve the problem of the prior art.

One aspect of the present invention is to provide an energy-based oriented switching mode power supply, that takes no extra mode detection/change circuits, yet allowing the energy-based oriented switching mode power supply to achieve a hybrid operation of PFM and PWM.

Another aspect of the present invention is to provide an energy-based oriented switching mode power supply, that uses only one single control circuit to immediately switch a power MOS of the converter on or off, depending on the energy demand of the load circuit, thereby achieving a best operating mode.

Still another aspect of the present invention is to provide an energy-based oriented switching mode power supply that provides a hybrid of PWM and PFM, allowing the converter with an energy-based pulse generator to achieve a fast transient response and a small voltage ripple whilst improving power efficiency over a wide load range.

In order to achieve the above-mentioned objective, an energy-based oriented switching mode power supply is provided that includes a bi-directional converter and an energy based pulsed generator. The bi-directional converter has an energy input and a load output. The energy based pulsed generator is connected between the energy input and the load output for outputting a gate voltage signal in response to controlling energy supplied from the energy input. The energy based pulsed generator receives a clock signal and outputs the gate voltage signal according to the load output of the bi-directional converter when the clock signal is at a high level.

According to one embodiment of the present invention, the energy based pulsed generator sets the gate voltage signal to low when the clock signal is at the high level and the load output of the bi-directional converter is a heavy load. Also, the energy based pulsed generator can operate at a higher switching frequency to provide sufficient energy instantaneously to the load output.

According to one embodiment of the present invention, the energy based pulsed generator sets the gate voltage signal to high when the clock signal is at the high level, the load output of the bi-directional converter is a light load, and the energy supplied previously is still enough. Also, the energy based pulsed generator can operate at a lower switching frequency to reduce the switching losses of the bi-directional converter.

According to another embodiment of the present invention, the energy based pulsed generator increases a switching frequency of the gate voltage signal to provide sufficient energy to the load output when the load output of the bi-directional converter is changing from the light load to the heavy load.

According to another embodiment of the present invention, the energy based pulsed generator decreases a switching frequency of the gate voltage signal to pause supplying energy to the load output when the load output of the bi-directional converter is changing from the heavy load to the light load.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings. And, in the following, various embodiments are described in explaining the technical characteristics of the present invention.

The proposed invention provides a novel energy-based oriented switching mode power supply, whose main control circuit, an Energy Based Pulsed Generator (EBPG) can be applied to all kinds of switching mode power supplies.

The proposed energy-based oriented switching mode power supply achieves a hybrid of PWM and PFM, that adjusts a duty cycle (or duty period) and a switching frequency of the converter to switch its power on or off, depending on the energy demand of the load circuit. In this manner, the energy-based oriented switching mode power supply having an energy-based pulse generator is advantageous of a fast transient response and a small voltage ripple whilst improving power efficiency over a wide load range.

Figure 1:
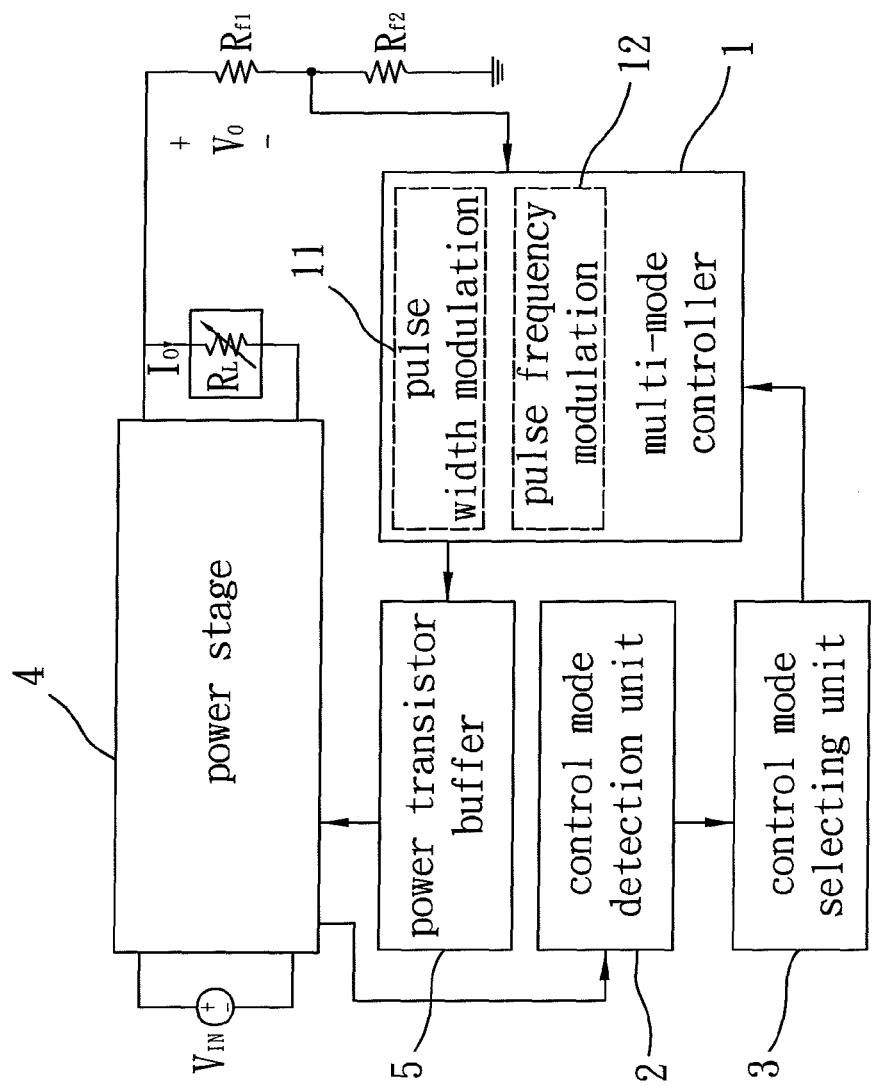
FIG. 1 illustrates a conventional circuit diagram of control mode hopping technology.
Figure 2:
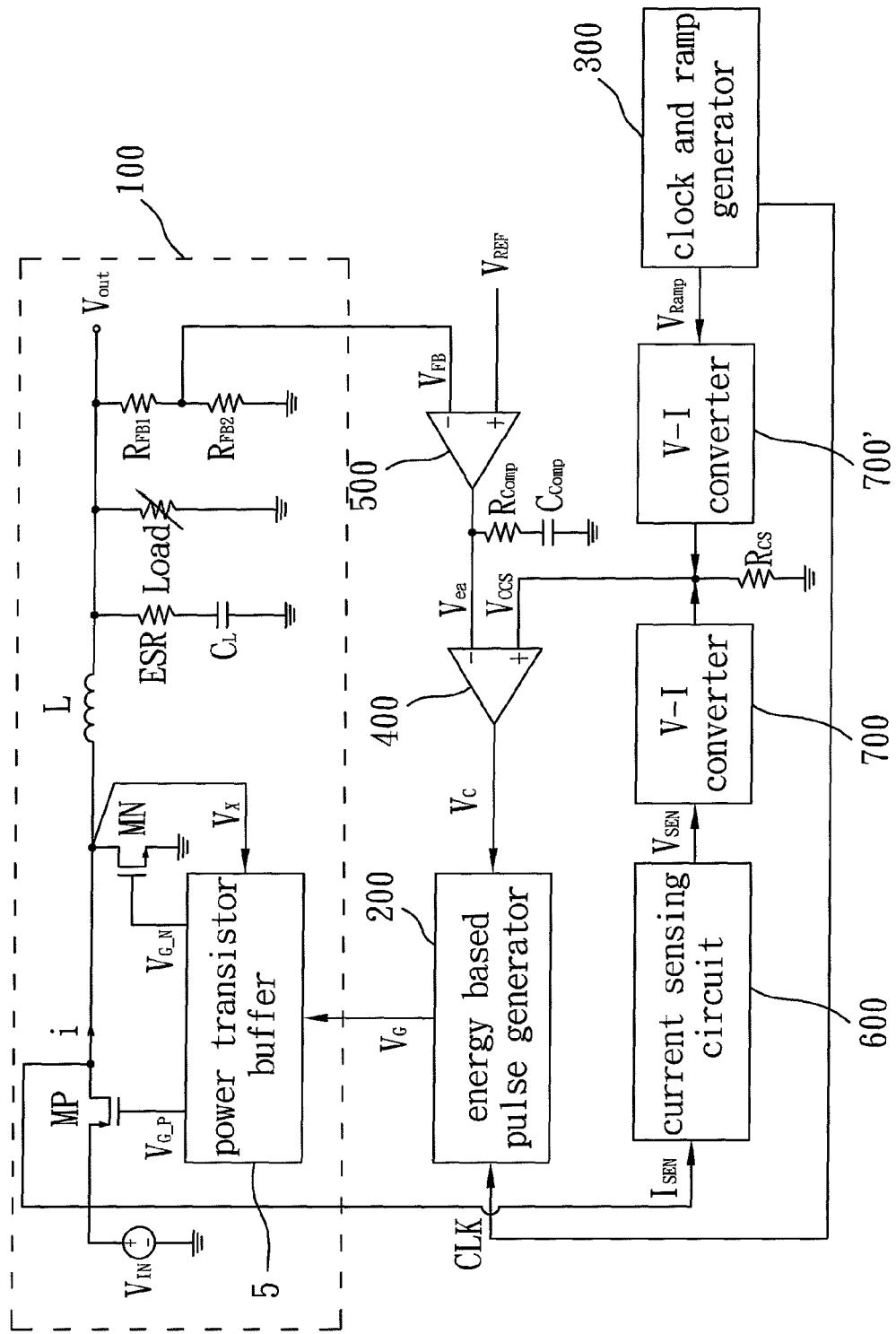
FIG. 2 is a block diagram of an energy-based oriented switching mode power supply according to an embodiment of the present invention.

Refer to FIG. 2, which is a block diagram of an energy-based oriented switching mode power supply according to an embodiment of the present invention. The switching mode power supply of the present invention includes a bi-directional converter 100 and an EBPG 200. The bi-directional converter 100 has an energy input Vin and a load output Vout. The EBPG 200 generates a gate voltage signal $V_G$, and is connected between the energy input Vin and the load output Vout.

In one embodiment, the bi-directional converter 100 includes a power transistor buffer 5 and two active switches MP,MN. The power transistor buffer 5 receives and extracts the gate voltage signal $V_G$ into two signals $V_{G\_P}$, $V_{G\_N}$ that are used to drive the active switches MP, MN, respectively. As a result, by employing the two signals $V_{G\_P}$, $V_{G\_N}$ to switch the two active switches MP,MN, an energy provided from the energy input Vin of the bi-directional converter 100 is well controlled. In this embodiment, any one of the two active switches MP,MN can be a Metal-Oxide-Semiconductor Field-Effect Transistor (MOSFET), however, the invention is not limited thereto.

As continue referring to FIG. 2, in one embodiment, the proposed energy-based oriented switching mode power supply further comprises a clock and ramp generator 300. The clock and ramp generator 300 generates a clock signal CLK. The EBPG 200 receives the clock signal CLK and a comparison signal Vc, and outputs the gate voltage signal $V_G$. When the clock signal CLK is set at a high level, the EBPG 200 outputs the gate voltage signal $V_G$ in response to a load condition of the load output Vout of the converter 100.

Accordingly, the proposed invention uses a single control circuit, that is, the EBPG 200 for providing a proper duty period and switching frequency for the active switches MP、MN, depending on the energy demand (i.e. the load condition) of the load output Vout. The waveform diagrams are illustrated as FIG. 3A and FIG. 3B.

Consider that the highest switching frequency (fs,max) of the proposed converter is limited by the external inductor and capacitor, which are low-cost and prevalent. In the case of a gradually changing load current from a heavy load to a light load, ($I_{Load1} \rightarrow I_{Load2} \rightarrow I_{Load3} \rightarrow I_{Load4}$), the on-time of power MOS (Ton) is also gradually reduced towards a minimized value. The duty cycle (D) of the switching pulse of power MOS is defined in Equation (1) below:

$$\text{Duty}(D) = \frac{T_{ON}}{T_S} = \frac{V_{OUT}}{V_{IN}} = \frac{I_{load}R_{load}}{V_{IN}} \quad (1)$$

where Ts, $I_{load}$, $R_{load}$, $V_{OUT}$, and $V_{IN}$ represents the period of one switching cycle, load current, equivalent resistance of load circuit, regulated output, and input supply voltage, respectively.

When the on-time of power MOS approaches the minimum value, the energy demand of the load circuit is relatively low, and hence the load current is also relatively low. Conduction losses become non-dominant as compared with switching losses, and the power MOS doesn't need to be switched on during each cycle to provide energy. Thus, as shown in FIG. 2, the switching pulse generated by the EBPG 200 will appear to be random. If the energy provided previously is enough and the load circuit doesn't demand any more energy, the power MOS MP、MN are switched off during the entire switching cycle to reduce switching losses.

Figure 3A:
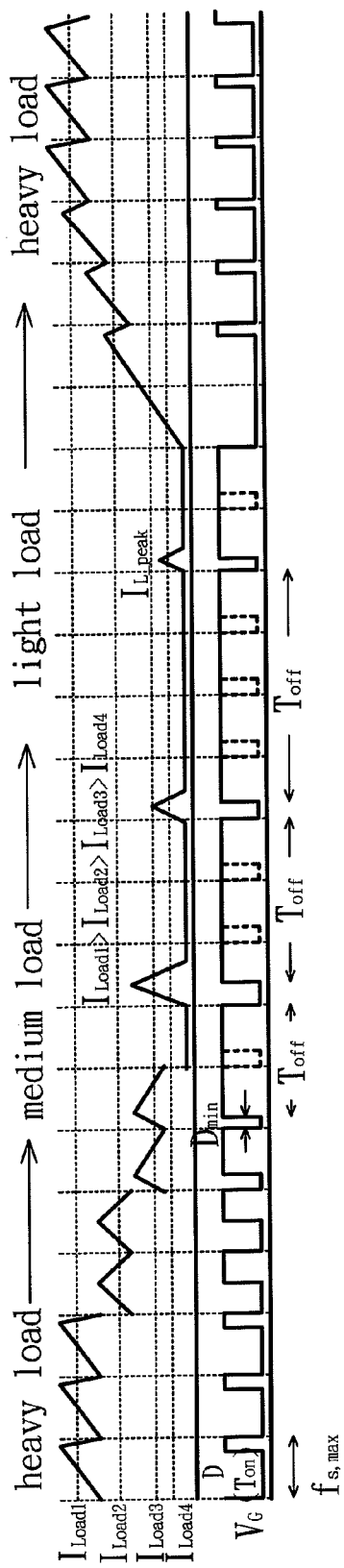
FIG. 3A is a waveform diagram of an energy-based oriented switching mode power supply changing from a heavy load to a light load according to an embodiment of the present invention.
Figure 3B:
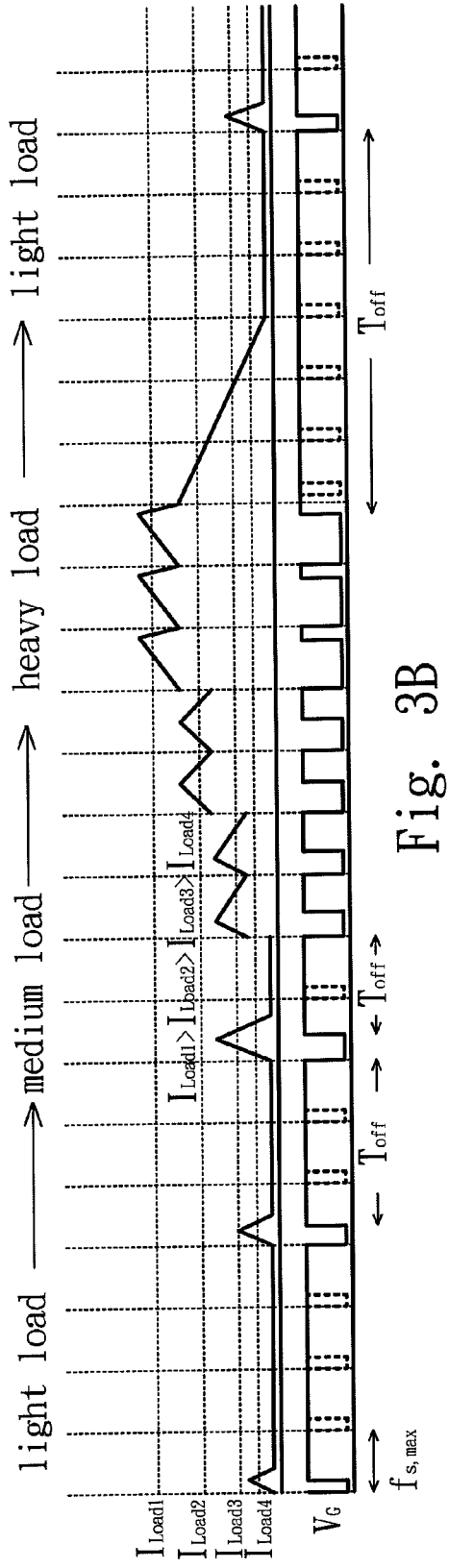
FIG. 3B is a waveform diagram of an energy-based oriented switching mode power supply changing from a light load to a heavy load according to an embodiment of the present invention.

In addition, as shown in FIG. 3B, if the energy provided previously is insufficient, the EBPG 200 will set the power MOS MP to be switched on with an appropriate Ton, which was defined in above-mentioned Equation (1) that adaptively provides sufficient peak current to the inductor ($I_{L\_peak}$) and keeps the output ripple small. In this case, the on-time of the power MOS MP and the peak current provided to the inductor ($I_{L\_peak}$) can be derived according to the Equation (2) as following:

$$\begin{cases} T_{ON} = \dfrac{L \cdot I_{L\_Peak}}{V_{IN} - V_{OUT}} \\ f_s = \dfrac{1}{T_S} = \dfrac{2 \cdot I_{Load}}{I_{L\_Peak}^2 \cdot L} \cdot V_{OUT} \cdot \left(1 - \dfrac{V_{OUT}}{V_{IN}}\right) \end{cases} \quad (2)$$

Also, with respect to the Equation (2), the switching frequency of the power MOS under different load current can be derived as well. In other words, when the load current is gradually decreasing, the switching frequency of the converter will get lower, thus reducing the switching losses taking place at switching the power MOS on or off and therefore enhancing the power transfer efficiency of the converter over a light load condition.

In the case of a gradually changing load current from a light load to a heavy load, ($I_{Load4} \rightarrow I_{Load3} \rightarrow I_{Load2} \rightarrow I_{Load1}$), the EBPG 200 will increase the switching frequency of the power MOS MP so as to provide sufficient energy to the output load of the converter. When the converter reaches back to the preset switching frequency (fs,max), the EBPG 200 can further increase the on-time of the power MOS to provide even more energy input.

Accordingly, in order to provide a sufficient energy to the load output, when the load output Vout of the bi-directional converter 100 is changing from a light load to a heavy load, the EBPG 200 increases the switching frequency of the gate voltage signal $V_G$. On the other hand, while the load output Vout of the bi-directional converter 100 is changing from a heavy load to a light load, the EBPG 200 decreases the switching frequency of the gate voltage signal $V_G$, in order to pause supplying energy to the load output until the load output needs energy again.

Moreover, please be attentive to FIG. 3A again. If the load current suddenly increases dramatically, for example, the load condition quickly changing from a light load to a heavy load all of a sudden, the EBPG 200 will generate the gate voltage signal $V_G$ having a plurality of off-time periods. As shown in FIG. 3A, the gate voltage signal $V_G$ can for example have two off-time periods. In this example, the EBPG 200 will switch the power MOS MP on immediately and last for many switching cycles until it can provide enough energy (shown in $V_G$ of FIG. 3A) while the dual mode converter changes the operating mode from PFM to PWM and increase the inductor current gradually. After the instantaneous energy requirement is supplied, the EBPG 200 will switch the power MOS at the frequency (fs,max) with the duty cycle in accordance with the above-mentioned Equation. (1) for reducing conduction losses.

As far as the case of suddenly decreasing load current dramatically is concerned, for example, as shown in FIG. 3B, the load condition quickly changing from a heavy load to a light load all of a sudden. The EBPG 200 will switch off the power MOS MP、MN in the subsequent switching cycles to retain the energy at the load output until the provided energy is insufficient as changing the operating mode from PWM to PFM after several PWM cycles. Therefore, the converter with the EBPG 200 can achieve a fast transient response and a small voltage ripple with improved power transfer efficiency for applications requiring a wide load range.

Figure 4:
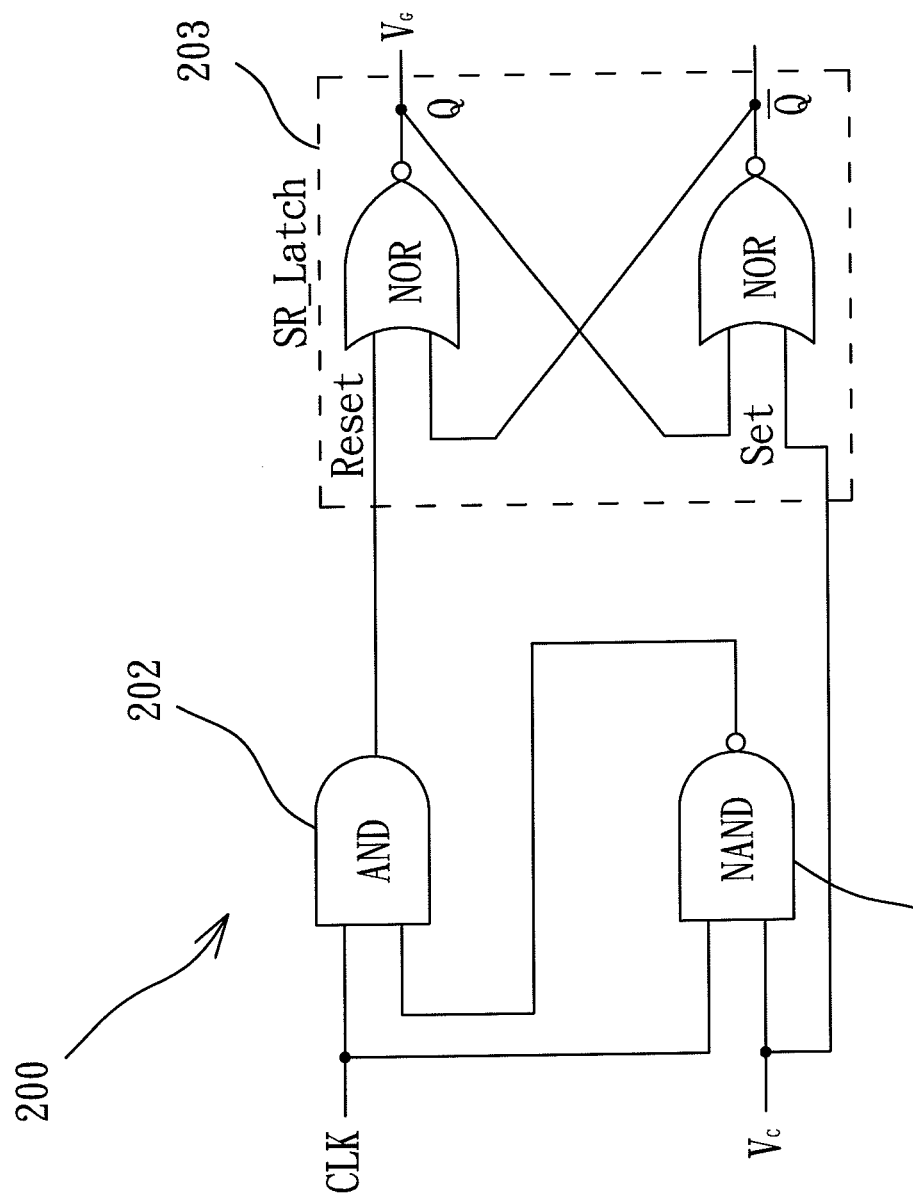
FIG. 4 is a detailed circuit implementation of an energy based pulse generator according to one embodiment of the present invention.

Refer to FIG. 4, which is a detailed circuit implementation of an energy based pulse generator according to one embodiment of the present invention. As shown in FIG. 4, the EBPG 200 according to one embodiment of the invention includes a NAND logic gate 201, an AND logic gate 202 and a SR latch 203.

In one embodiment of the invention, two inputs of the NAND logic gate 201 receive the clock signal CLK and the comparison signal Vc, respectively. One input of the AND logic gate 202 receives the clock signal CLK while the other input of the AND logic gate 202 is connected to an output of the NAND logic gate 201. One input of the SR latch 203 is connected to an output of the AND logic gate 202 while the other input of the SR latch 203 receives the comparison signal Vc. An output of the SR latch 203 generates the gate voltage signal $V_G$.

The clock signal CLK is used to determine when the on-time of the gate voltage signal $V_G$ starts, while the comparison signal Vc is used to determine when it ends. In one embodiment, the EBPG 200 is designed to have a priority of the comparison signal Vc prior to the clock signal CLK. As a result, the EBPG 200 achieves a hybrid of PWM and PFM, adjusting both the duty period and pulse width at the same time without employing any other complicated circuit implementation.

In one embodiment of the invention, as shown in FIG. 2, the comparison signal Vc is output by a hysteretic comparator 400. The hysteretic comparator 400 has a positive input and a negative input being configured to receive a sensing current voltage signal $V_{ccs}$ and an error amplified signal $V_{ea}$, respectively.

In one embodiment of the invention, the error amplified signal $V_{ea}$ is carried out by an error amplifier 500, wherein the error amplifier 500 compares an energy $V_{FB}$ fed back from the load output $V_{out}$ of the bi-directional converter 100 to an reference signal $V_{REF}$, and outputs the error amplified signal $V_{ea}$. The sensing current voltage signal $V_{ccs}$ is carried out by a current sensing circuit 600 and a V-I converter 700, wherein the current sensing circuit 600 detects a current of the power MOS MP, and the V-I converter 700 receives the detection result, transfers it and outputs to be the sensing current voltage signal $V_{ccs}$.

Therefore, the error amplified signal $V_{ea}$ is corresponding to how much the energy demand of the load output $V_{out}$ of the bi-directional converter 100 is, while the sensing current voltage signal $V_{ccs}$ is corresponding to how much the energy supplied at the energy input Vin of the bi-directional converter 100 is.

Figure 5:
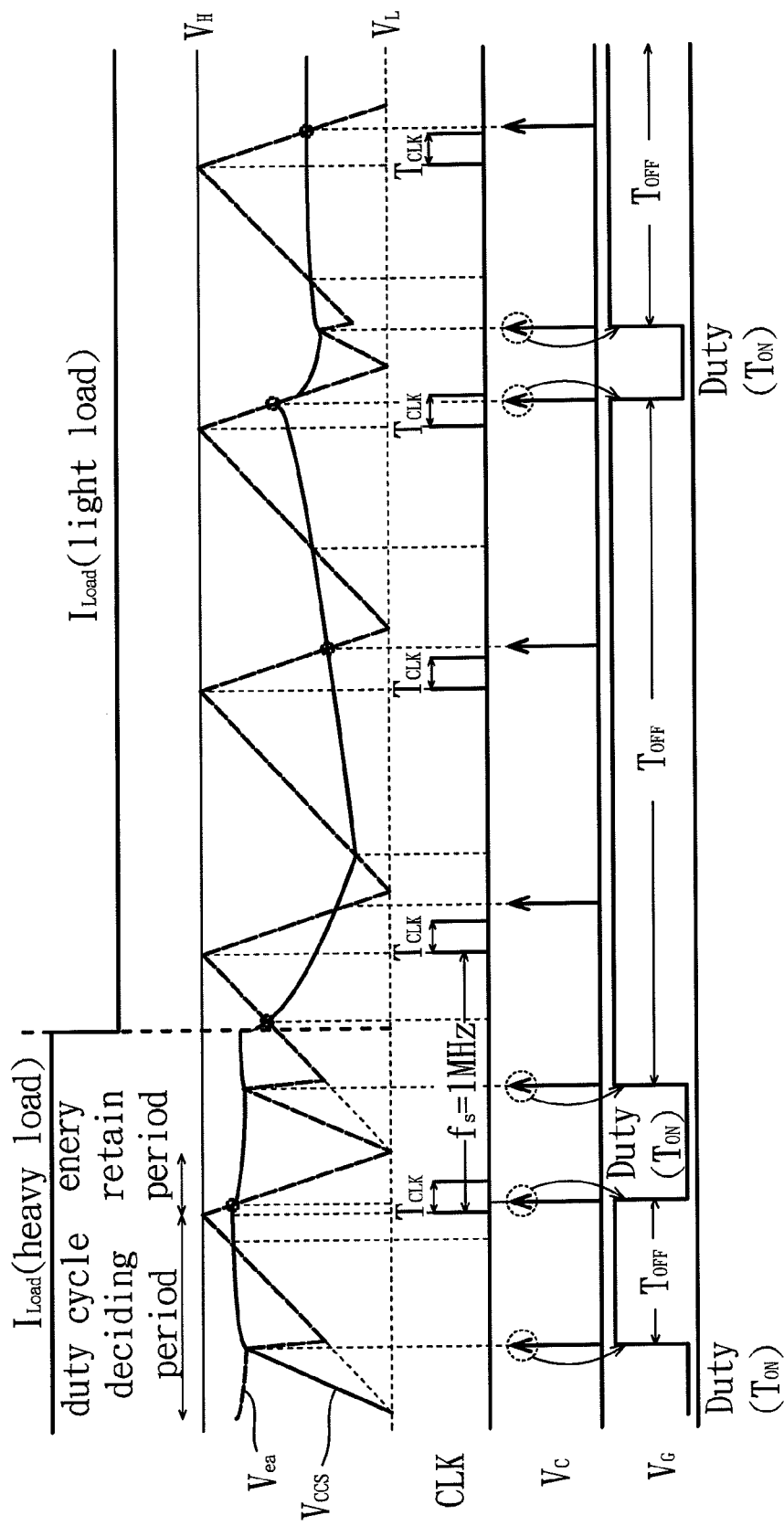
FIG. 5 is a waveform diagram of an energy-based oriented switching mode power supply according to an embodiment of the present invention.

Since the comparison signal Vc is output by the hysteretic comparator 400 which compares the sensing current voltage signal $V_{ccs}$ to the error amplified signal $V_{ea}$, the comparison signal Vc is set to be at high level when the energy supplied at the energy input Vin is greater than the energy demand of the load output $V_{out}$ of the bi-directional converter 100, which means the load condition of the converter is a light load. Under a circumstance like this, as shown in FIG. 5, the EBPG 200 outputs a high-level gate voltage signal $V_G$ when the clock signal CLK is high.

On the other hand, when the clock signal CLK is high and the energy supplied at the energy input Vin is less than the energy demand of the load output $V_{out}$ of the bi-directional converter 100, which means the load condition of the converter is a heavy load, the EBPG 200 outputs a low-level gate voltage signal $V_G$.

Therefore, it is apparent that, the proposed invention uses only one single control circuit to adjust both the PWM and PFM without employing any other detection/change circuit, but only depending on the energy demand of the load output. As a result, the present invention is not only easier to accomplish with respect to the prior art but also advantageous of a fast transient response.

Table 1 illustrates a performance evaluation result comparing the present invention to the conventional bulk converter. It is evident that the present invention achieves a fast transient response and an accurate output voltage while improving power efficiency over a wide load range.

TABLE 1

|  | The present invention | Conventional bulk converter |
|---|---|---|
| Energy input/energy output | 3.3 V/1.8 V | 3.6 V/1.8 V |
| Overshooting voltage/ undershooting voltage | 58.78 mV/51.6 mV | 130 mV/66.5 mV |
| Transient response @ (500 mA ⟷ 10 mA) | 1.2 μs/2 μs | 28 μs/10 μs |
| Ripple | 18 mV | 25 mV |
| Power transfer efficiency @(500 mA ⟷ 10 mA) | >88% | >88% |

To sum up above, the present invention discloses an energy-based oriented switching mode power supply, that uses an energy based pulse generator for enhancing the transient response while improve the power transfer efficiency for applications requiring a wide load range. The proposed switching mode power supply achieves a power efficiency improvement of 12.03% at loads of 10 mA~500 mA. Meanwhile, the overshoot/undershoot was only 58.78 mV/51.6 mV with a response time of 1.2 μs/2 μs for the load transient, the ripple voltage was smaller than 18 mV.

Accordingly, since the present invention provides an energy-based oriented switching mode power supply, which requires no extra mode detection/change circuits, yet allowing the energy-based oriented switching mode power supply to achieve a hybrid operation of PFM and PWM, its circuit implementation will be much easier to accomplish and operate. Also, the production cost and complexity of the circuit will be dramatically reduced.

Further, the present invention discloses an energy-based oriented switching mode power supply, that provides a hybrid of PWM and PFM, allowing the converter with an energy-based pulse generator to achieve a fast transient response and a small voltage ripple whilst improving power efficiency over a wide load range.

As a result, by employing the converter with an energy-based pulse generator, the converter can be automatically switched to a best operating mode, depending on the energy demand of the load output condition. Therefore, the energy-based oriented switching mode power supply achieves a hybrid of PWM and PFM, and can be applied to all kinds of electronics products for manufacturers in recent markets as potential products.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An energy-based oriented switching mode power supply, comprising:
   a bi-directional converter having an energy input and a load output; and
   an energy based pulsed generator being connected between the energy input and the load output of the bi-directional converter for outputting a gate voltage signal, which controls energy supplied from the energy input, wherein the energy based pulsed generator receives a clock signal, and outputs the gate voltage signal according to the load output of the bi-directional converter when the clock signal is at a high level, and the energy based pulsed generator comprises:
   a NAND logic gate comprising two inputs and an output, wherein the two inputs of the NAND logic gate receive the clock signal and a comparison signal, respectively;
   an AND logic gate comprising two inputs and an output, wherein one of the inputs of the AND logic gate receives the clock signal while the other input of the AND logic gate is connected to the output of the NAND logic gate; and
   a SR latch comprising
      two inputs, wherein one of the inputs of the SR latch is connected to the output of the AND logic gate, and the other input of the SR latch receives the comparison signal; and
      an output for generating the gate voltage signal.

2. The energy-based oriented switching mode power supply as claimed in claim 1, wherein the clock signal is output by a clock and ramp generator.

3. The energy-based oriented switching mode power supply as claimed in claim 1, wherein the energy based pulsed generator sets the gate voltage signal to low when the clock signal is at the high level and the load output of the bi-directional converter is a heavy load, and the energy based pulsed generator sets the gate voltage signal to high when the clock signal is at the high level, the load output of the bi-directional converter is a light load, and the energy supplied previously is still enough.

4. The energy-based oriented switching mode power supply as claimed in claim 3, wherein the energy based pulsed generator increases a switching frequency of the gate voltage signal to provide sufficient energy to the load output when the load output of the bi-directional converter is changing from the light load to the heavy load.

5. The energy-based oriented switching mode power supply as claimed in claim 3, wherein the energy based pulsed generator decreases a switching frequency of the gate voltage signal to pause supplying energy to the load output when the load output of the bi-directional converter is changing from the heavy load to the light load.

6. The energy-based oriented switching mode power supply as claimed in claim 3, wherein when the load output quickly changes from the light load to the heavy load all of a sudden, the energy based pulsed generator generates the gate voltage signal having a plurality of ON-time periods to provide enough energy to the load output.

7. The energy-based oriented switching mode power supply as claimed in claim 3, wherein when the load output quickly changes from the heavy load to the light load all of a sudden, the energy based pulsed generator switches off an active switch in the subsequent switching cycles to retain the energy at the load output to reduce conduction losses.

8. The energy-based oriented switching mode power supply as claimed in claim 1, further comprising a hysteretic comparator comprising:
   a positive input being used to receive a sensing current voltage signal; and
   a negative input being used to receive an error amplified signal, wherein the error amplified signal is corresponding to how much the energy demand of the load output of the bi-directional converter is, while the sensing current voltage signal is corresponding to how much the energy supplied at the energy input of the bi-directional converter is.

9. The energy-based oriented switching mode power supply as claimed in claim 8, wherein the load output of the bi-directional converter is a light load when the comparison signal is set to be high.

10. The energy-based oriented switching mode power supply as claimed in claim 8, wherein the load output of the bi-directional converter is a heavy load when the comparison signal is set to be low.

11. The energy-based oriented switching mode power supply as claimed in claim 1, wherein the bi-directional converter includes at least one active switch that is driven by the gate voltage signal for controlling the energy supplied from the energy input.

12. The energy-based oriented switching mode power supply as claimed in claim 11, wherein the at least one active switch is a Metal-Oxide-Semiconductor Field-Effect Transistor (MOSFET).

* * * * *